Dec. 2, 1941.  R. H. PARK  2,265,002

SKEIN HOLDER

Filed June 8, 1939  2 Sheets-Sheet 1

INVENTOR.
ROBERT H. PARK,
BY Robert Ames Norton
ATTORNEY.

Dec. 2, 1941.　　　R. H. PARK　　　2,265,002
SKEIN HOLDER
Filed June 8, 1939　　　2 Sheets-Sheet 2
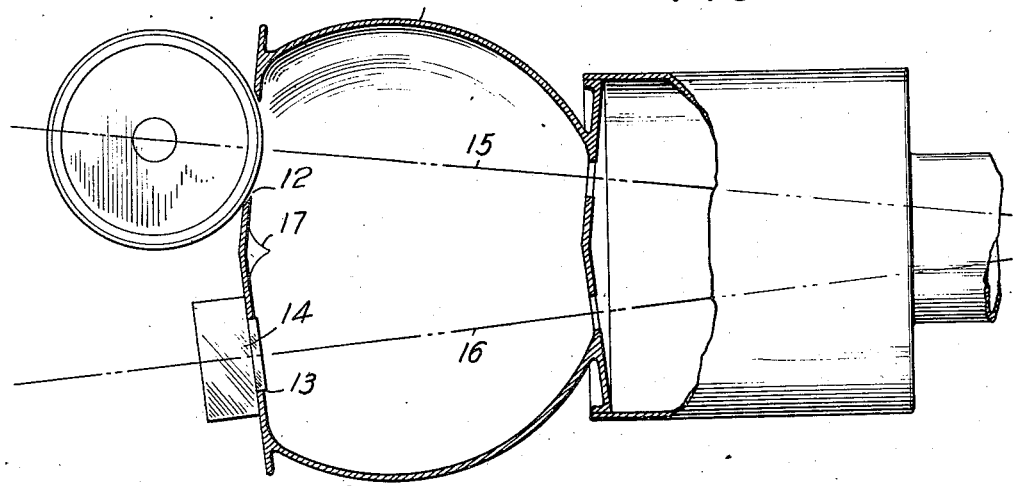
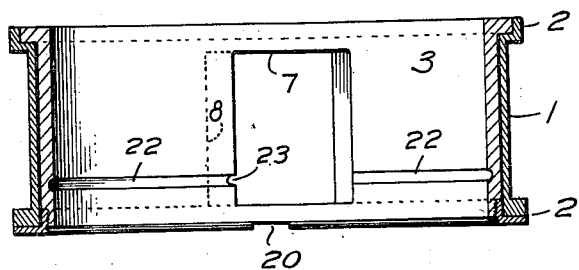
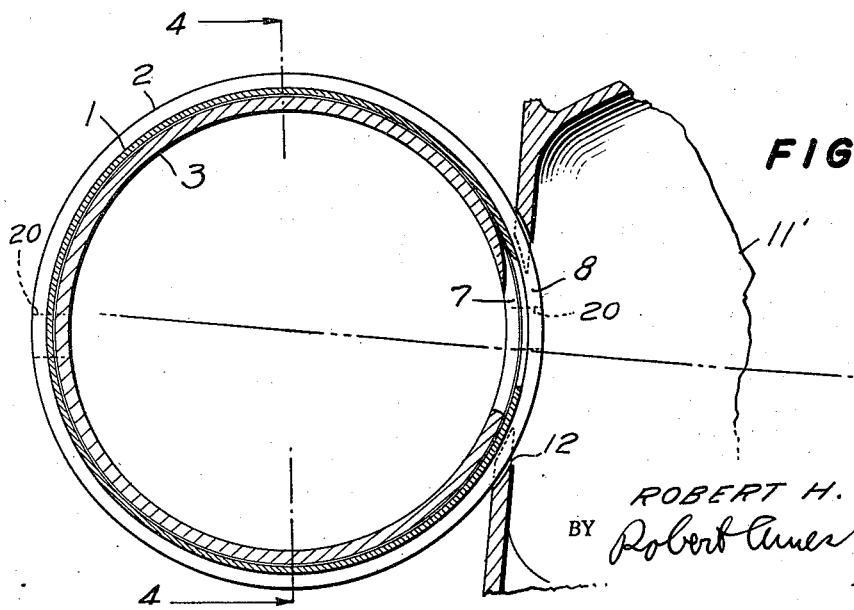
INVENTOR.
ROBERT H. PARK,
BY
ATTORNEY.

Patented Dec. 2, 1941

2,265,002

UNITED STATES PATENT OFFICE 2,265,002

SKEIN HOLDER

Robert H. Park, Millington, N. J., assignor, by mesne assignments, to American Cyanamid Company, New York, N. Y., a corporation of Maine Application June 8, 1939, Serial No. 278,004

5 Claims. (Cl. 242—127)

This invention relates to skein holders and accessory apparatus, particularly for use with flicker type recording spectrophotometers or colorimeters.

In the past, great forward steps have been made in spectrophotometry by the recording flicker type spectrophotometer such as those described in the patents to Pineo, No. 2,107,836 issued February 8, 1938, and No 2,126,410 issued August 9, 1938. These devices permit reducing to graphic form the spectral absorption of various colored materials rapidly and simply. They are, however, open to certain inherent inaccuracies. Thus, for example, when dealing with a reflectance sample of non-uniform surface, such as for example a skein of yarn, readings are not always accurate for several reasons. In the first place, it is almost impossible to produce a sample surface of yarn which is entirely homogeneous and it is even more difficult to produce such a surface which is homogeneous in respect to reflection of light. Hence varying results are obtained when the same sample is moved or displaced. This introduces an inaccuracy which is of fundamental importance.

It would be a relatively simple matter to obtain a uniform surface for a yarn sample if the yarn were wound on a drum which was then rotated rapidly with respect to the speed of recorder pen motion so that the reflectance would be an average and hence non-uniform reflectance of individual portions would be cancelled out. In fact, attempts have been made in the past to measure colored skeins of yarn in the spectrophotometer by this means. They are not, however, practical because of the excessive time required in order to wind yarn on a drum.

The present invention relates to a skein holder on which a skein can be rapidly placed without unwinding the skein or winding it onto the holder. The holder is also of such shape that it can be fitted on a rotating device and rapidly rotated in front of the sample aperture or window of a flicker type spectrophotometer.

Further and specific features include a modification of spectrophotometer integrating sphere to prevent stray light effects and to prevent cross reflection from sample and standard and a further feature of a more specific embodiment of the invention includes a device for rapidly changing skeins on the holder.

The invention will be described in greater detail in conjunction with the drawings in which Fig. 1 is a perspective elevation of a skein holder according to the present invention and a loading block therefor;

Fig. 4 is a vertical section through a skein holder taken along the line 4—4 of Fig. 6;

Fig. 5 is an assembly of spectrophotometer integrating sphere and skein holder in place, being partly in horizontal section and partly in plan view; and Fig. 6 is a horizontal section through a skein holder and a portion of the integrating sphere of Fig. 5.

Figure 1:
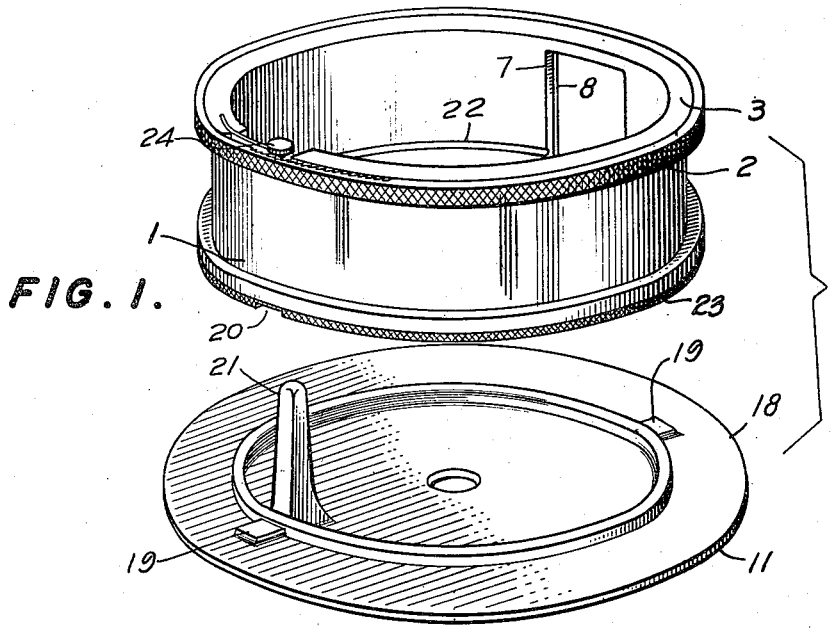

The skein holder consists of two concentric drums, the outer one 1 having a recessed polished face and knurled flange 2 at the top. An inner cylinder member 3 fits snugly into the drum 1 and is held from moving by a knurled flange 23. The two members are, therefore, capable of rotation with respect to each other but are locked against axial motion.

Figure 3:
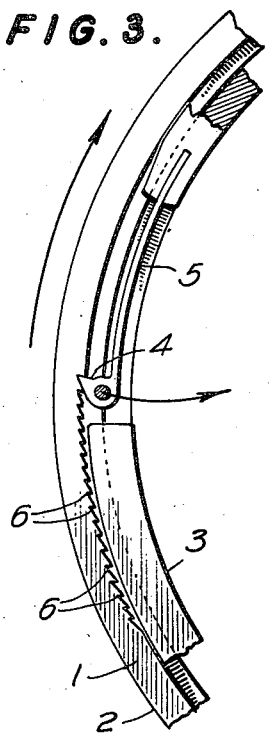
Fig. 3 is fragmentary plan view of the structure of Fig. 1 partially broken away and shown in section.

The two members of the skein holder are provided with openings 7 and 8 (Figs. 1, 4 and 6) and the outer member is provided with ratchet teeth 6 engaging a pawl 4 mounted on a spring 5 attached to the inner member and capable of being moved by a button 24 (Figs. 1 and 3).

When the button 24 has been moved inwardly so that the pawl 4 no longer engages with the ratchet teeth 6, it is possible to turn the two members of the skein holder until their openings coincide as is shown in Fig. 1. The skein holder is then placed on the block or mandril 11 provided with the lugs 19 engaging in recesses 20 of the outer member of the skein holder. A pillar 21 is an integral part of the loading block 18 and is positioned opposite one of the lugs 19 which centers it behind the button 24 of the skein holder when the latter is placed on the loading block.

A skein is then wrapped around the polished portion of the outer member of the skein holder and the ends pulled through the opening of the skein holder. A counter-clockwise rotation of the outer member 1, (when viewed from above), moves the two openings 6 and 7 out of register until one edge of the opening of the inner member clamps the skein ends against the opposite edge of the opening of the outer member. The beginning of this rotation is shown in Figs. 4 and 6, the skein ends for simplicity being omitted. When the outer member of the skein holder has been turned counter-clockwise sufficiently to tightly clamp the skein ends, it is retained in this position by the pawl 4 and ratchet teeth 6 and the whole skein holder with the skein wrapped around the outer member 1 can be lifted off as a unit. After use, the skein holder is replaced on the block, the button 24 pushed in against the pillar 21 as a stop, and the outer member rotated to bring the slots in the two members in register so that the skein can be removed. The pillar 21 is not essential to the operation of the skein holder and its loading block but is helpful for rapid operation in practice as if there is no stop there is a tendency to push on the button 24 too hard which sometimes results in breaking the spring 5.

Figure 2:
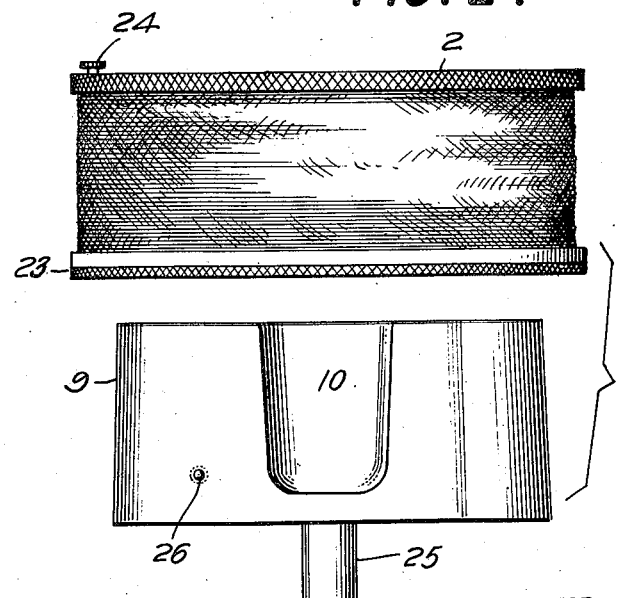
Fig. 2 is a vertical elevation of a skein holder with a skein arranged thereon and a holder rotating drum.

Fig. 2 shows the skein holder with the skein wrapped on 1. This figure also shows the skein rotating drum 9 which is provided with a recess 10 to take the bunch formed by the two skein ends clamped by the openings of the skein holder members. The skein holder fits on the slightly conical drum 9 and is held by ball clicks snapping into the groove 22 sufficiently tightly so that it can be rotated thereby.

Fig. 5 shows an integrating sphere of a typical flicker type spectrophotometer, the sphere being numbered 26 and being provided with a sample window 12 and a standard window 13. A block of standard white magnesium carbonate 14 completely covers the window 13 and the skein holder extends into the window 12 sufficiently so that substantially the whole of the light reflected from the sample impinges on the whitened sphere walls. This necessitates a projection of the skein holder for some small distance into the integrating sphere as is shown in Figs. 5 and 6. There is accordingly some possibility that light from the white standard 14 might be reflected directly across to the sample 15. Such cross reflection affects the accuracy of the instrument. To prevent it and improve the accuracy, there is provided a projection or fin 17 on the integrating sphere wall projecting sufficiently far to cut off direct reflection from standard to sample and vice versa.

In operation the spectrophotometer runs in the normal manner and the skein holder is rapidly rotated by its drum 9 which is turned by its shaft 25 from any suitable source of power (not shown). The rotation of the skein holder is preferably made sufficiently rapid with respect to the rate of recorder pen motion so that the reflectance of the skein on its surface is averaged out.

It is an advantage of the present invention that a plurality of skein holders may be used and loaded and unloaded by an operator and rapidly replaced on the drum 9. This permits loading a skein holder in a very short period of time to produce a surface of uniform reflecting characteristics. In fact, the time required for loading a skein holder with a loading block such as that shown in Fig. 1 is much shorter than the normal time required for drawing a spectrophotometric curve on a recording spectrophotometer, a matter of two or three minutes. The use of the skein holders of the present invention does not lengthen the time cycle of the spectrophotometer itself and the machine can therefore be used at full out-put.

It is a further advantage of the present invention that skeins can be loaded onto a skein holder not only rapidly but with a high degree of uniformity because the skein of yarn is drawn tight by use of the loading block 18 and the strands therefore tend to arrange themselves with a high degree of uniformity around the surface 1 of the outer member of the holder. This is of advantage as it enables the obtaining of reproduceable data. The uniformity of the skein surfaces on the holder is comparable to that obtainable by painstakingly unraveling by hand a skein and winding it onto a drum. This high degree of uniformity is obtained without the lost time necessitated by hand unraveling and winding and it is therefore a further advantage of the present invention that the great saving of time which it permits its obtained without any sacrifice of accuracy.

The present invention is not broadly limited to a particular mechanical design shown in the specific description of the preferred embodiment of the invention and any means which will retain the members in the position after rotation to clamp the skein ends may be employed. This may be friction or any other type of lock. For practical purposes, the ratchet and pawl described in the specific embodiment of the invention presents many advantages and is the preferred embodiment.

What I claim is:

1. A skein holder for holding skeins of yarn for spectrophotometric measurements comprising two cylindrical members rotatively fitting one within the other, each member being provided with a slot or opening capable of registering with the opening of the other member and of sufficient size to permit drawing of skein ends therethrough when in complete registery, and positive means for holding the members after rotation to a position where the edges of the slots clamp the skein, whereby further relative rotation of the members in either direction is prevented.

2. A skein holder for holding skeins of yarn for spectrophotometric measurements comprising two cylindrical members rotatively fitting one within the other but locked against axial movement, each member being provided with a slot or opening capable of registering with the opening of the other member and of sufficient size to permit drawing of skein ends therethrough when in complete registry, ratchet means permitting relative rotation of the members in one direction and locking against reverse rotation and manually operable means for disengaging said ratchet means.

3. A skein holder for holding skeins of yarn for spectrophotometric measurements comprising two cylindrical members rotatively fitting one within the other but locked against axial movement, the outer member having a recessed cylindrical external surface and a upper and lower flange, each member being provided with a slot or opening capable of registering with the opening of the other member and of sufficient size to permit drawing of skein ends therethrough when in complete register, ratchet means permitting relative rotation of the members in one direction and locking against reverse rotation and manually operable means for disengaging said ratchet means.

4. A skein holder for holding skeins of yarn for spectrophotometric measurements comprising two cylindrical members rotatively fitting one within the other but locked againts axial movement, the outer member having a recessed cylindrical external surface and an upper and lower flange, a plurality of recesses in one of the flanges, each member being provided with a slot or opening capable of registering with the opening of the other member and of sufficient size to permit drawing of skein ends therethrough when in complete register, ratchet means permitting relative rotation of the members in one direction and locking against reverse rotation and manually operable means for disengaging said ratchet means.

5. A skein holder and loading block assembly according to claim 3 in which there is provided a loading block with projections engaging the recesses in the flange of the outer member, said block being further provided with a projection so positioned that when the skein holder is mounted on the block with the projections engaging the recesses the pillar is within the periphery of the inner skein holder member and positioned adjacent to the opening of the outer member.

ROBERT H. PARK.